Sept. 22, 1942.   R. A. SMITH   2,296,297
STAPLE FIBER CUTTER
Filed Jan. 29, 1942
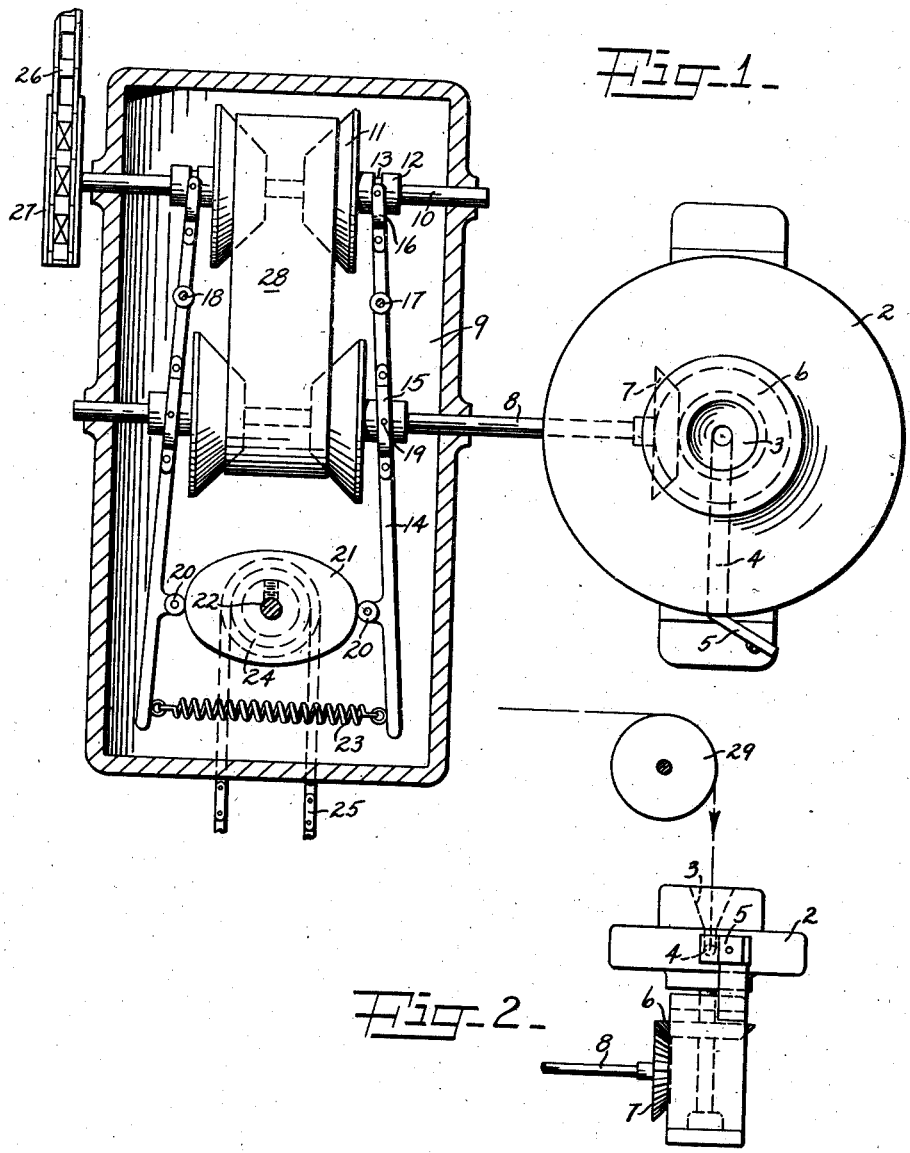
INVENTOR.
ROBERT A. SMITH
BY
Thomas R. O'Malley
ATTORNEY Patented Sept. 22, 1942

2,296,297

UNITED STATES PATENT OFFICE 2,296,297

STAPLE FIBER CUTTER

Robert A. Smith, Ridley Park, Pa., assignor to American Viscose Corporation, Wilmington, Del., a corporation of Delaware Application January 29, 1942, Serial No. 428,669

5 Claims. (Cl. 164—36)

This invention relates to a novel improved form of staple fiber cutter.

It is an object of the invention to provide a device for producing directly staple fiber products composed of fibers of various lengths. It is also an object to provide a device capable of producing any predetermined fixed length staple fiber and capable of being readily changed to produce a different length of staple fiber. Other objects of the invention will be apparent from the drawing and the description thereof hereinafter.

Figure 1 is a plan view of the device partially in cross-section, and

Figure 2 is an elevation view of a modification thereof.

The cutter shown in the drawing is of the Beria type (United States Patent 1,723,998) and is composed of the rotatable member 2 in the form of a disk provided with an inlet channel 3 extending axially downwardly into the disk connected with the radial passage 4 which extends outwardly from the disk, these passages constituting the feeding passage for a tow or yarn of the filamentary material to be cut into discontinuous lengths. The knife 5 is provided at the periphery and effects cutting of the tow extending outwardly from the radial channel in the disk, such cutting occurring once each revolution.

The centrifugal disk is operated by means of the bevel gear 6 in mesh with a second bevel gear 7 upon the shaft 8 operated by the continuous speed variator shown generally at 9.

This continuous speed variator is composed of the two parallel shafts 8 and 10 upon each of which a pair of opposed conical faced pulleys 11 respectively are slidably keyed. Each pulley is provided with a collar 12 having a groove 13. A pair of levers 14, each of which is provided with a yoke 15 encircling one of the collars 12 and a second yoke 16 at the end thereof embracing another are pivoted at 17 and 18 respectively. These yokes are provided with members 19 which extend into the collar grooves 13. These levers are provided with roller followers 20 cooperating with the cam 21 rotated by shaft 22. A spring 23 is fastened to the ends of the levers tending to draw them together, thereby causing the cam followers 20 to positively follow the cam 21. The cam shaft 22 may be driven by any suitable means, such as by the sprocket 24 and chain 25. Power is transmitted to the shaft 10 by any suitable means such as by a chain 26 and sprocket 27, a belt 28 being provided for transmitting rotation from this shaft 10 to the power takeoff shaft 8. As the cam rotates, the distance between the conical pulleys in each pair is varied so that the belt 28 in effect operates about two pulleys whose diameters vary inversely with respect to each other so that continuous speed variation is obtained.

Any suitable shape of cam may be provided, that shown in the figure being an elliptical shape. By continuously rotating the cam, the speed ratio between the two parallel shafts is continuously varied between two limits which depend upon the size of the major and minor axes of the cam respectively. By thus varying the speed of the take-off shaft, the speed of rotation of the rotatable tow-feeding member 2 may be varied, thereby varying the interval between cuts made by the knife 5.

Reliance may be placed solely upon the centrifugal action of the rotating disk 2 to draw the tow or filamentary material into the disk and to discharge it radially outwardly therefrom. However, the centrifugal action may be supplemented and, if desired, almost entirely subordinated by forcing the filamentary material through the passage by means of a jet of fluid, such as air. Again, a closer control of the range of fiber lengths in the product may be obtained by controlling or limiting the speed of passage of the tow through the rotating member 2 by means of a metering godet or other constant speed tow-feeding device. For example, in Figure 2, a metering godet 29 is provided which maintains the speed of feed of the tow at a constant rate below the rate of speed which would normally result from the centrifugal action of the rotating member 2.

The cam shown in Figure 1 may be replaced by others of any predetermined shape, thereby making it possible to obtain by a simple replacement a staple fiber product having any desired length distribution. Further variation in length distribution is made possible by varying the speed of rotation of any given cam employed within the apparatus.

The speed variator, of course, may be employed in such a manner that the cam is stopped at any desired position, in order to rotate the tow-feeding disk at any desired constant speed. Thus, by a simple turning of the cam to any desired fixed position, the continuous speed variator may be employed in a manner to facilitate changing from the cutting of one fixed length staple fiber to that of another and different fixed length staple fiber.

While preferred embodiments of the invention having been disclosed, the description is intended to be illustrative only, and it is to be understood that changes and variations may be made without departing from the spirit or scope of the invention as defined by the appended claims.

What I claim is:

1. An apparatus for cutting filamentary material at intervals to discontinuous lengths comprising cutting means, a rotating member for feeding said material to said cutting means, and means for continually varying the speed of rotation of said member during operation.

2. An apparatus for cutting filamentary material at intervals to discontinuous lengths comprising cutting means, a rotating member for feeding said material substantially radially therefrom to said cutting means, and means for continually varying the speed of rotation of said member during operation.

3. An apparatus for cutting filamentary material at intervals to discontinuous lengths comprising a rotating member for centrifugally feeding said material substantially radially outwardly therefrom, a cutting means adjacent the periphery of said member, and means for varying the speed of rotation of said member continually during operation.

4. An apparatus for cutting filamentary material at intervals to discontinuous lengths comprising cutting means, a rotating member for feeding said material substantially radially therefrom to said cutting means, means for maintaining constant the rate of outward feeding of filamentary material with respect to said member, and means for varying the speed of rotation of said member continually during operation.

5. An apparatus for cutting filamentary material at intervals to discontinuous lengths comprising a rotating member for centrifugally feeding said material substantially radially outwardly therefrom, a cutting means adjacent the periphery of said member, means for maintaining constant the rate of outward feeding of said filamentary material with respect to said member, and means for varying the speed or rotation of said member continually during operation.

ROBERT A. SMITH.